(12) United States Patent
Takata

(10) Patent No.: US 6,917,051 B2
(45) Date of Patent: Jul. 12, 2005

(54) SHEET-LIKE MEMBER CLEANING DEVICE AND RADIATION IMAGE INFORMATION READING APPARATUS WHICH INCORPORATES SUCH SHEET-LIKE MEMBER CLEANING DEVICE

(75) Inventor: Kenji Takata, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/798,565

(22) Filed: Mar. 12, 2004

(65) Prior Publication Data

US 2004/0169153 A1 Sep. 2, 2004

Related U.S. Application Data

(62) Division of application No. 09/813,982, filed on Mar. 22, 2001, now Pat. No. 6,725,776.

(30) Foreign Application Priority Data

Mar. 24, 2000 (JP) ........................................ 2000-085445

(51) Int. Cl.⁷ .............................................. G03B 42/08
(52) U.S. Cl. ...................................................... 250/589
(58) Field of Search .............................. 250/589, 581, 250/582, 484.4; 101/423, 424, 425

(56) References Cited

U.S. PATENT DOCUMENTS

| | | | |
|---|---|---|---|
| 3,843,964 A | 10/1974 | Fujimoto | |
| 3,909,864 A | 10/1975 | Tanaka et al. | |
| 3,969,785 A | 7/1976 | Ogawa et al. | |
| 4,543,479 A * | 9/1985 | Kato | 250/590 |
| 4,703,537 A * | 11/1987 | Yamamoto et al. | 15/102 |
| 5,315,358 A | 5/1994 | Parks et al. | |
| 5,446,292 A * | 8/1995 | Kohda | 250/585 |
| 5,477,584 A | 12/1995 | Thumm | |
| 5,772,495 A | 6/1998 | Sanda et al. | |
| 5,979,011 A | 11/1999 | Miyawaki et al. | |
| 6,493,535 B2 | 12/2002 | Okubo | |
| 6,575,093 B1 | 6/2003 | Principe | |

* cited by examiner

Primary Examiner—David Porta
Assistant Examiner—Faye Polyzos
(74) Attorney, Agent, or Firm—Sughrue Mion, PLLC

(57) ABSTRACT

Information carried on a stimulable phosphor sheet can accurately be read therefrom without dust particles being present on the surfaces of the stimulable phosphor sheet. A dust of a first cleaning unit has a first opening for introducing the stimulable phosphor sheet into the duct and a second opening for discharging the stimulable phosphor sheet out of the duct. The duct has an upper housing member which accommodates therein a first brush roller and a third brush roller that extend parallel to each other and a lower housing member which accommodates therein a second brush roller and a fourth brush roller that extend parallel to each other. The upper housing member also houses therein a first dust removing plate having tip ends held against bristles of the first brush roller and the third brush roller, and the lower housing member also houses therein a second dust removing plate having tip ends held against bristles of the second brush roller and the fourth brush roller.

15 Claims, 13 Drawing Sheets

SHEET-LIKE MEMBER CLEANING DEVICE AND RADIATION IMAGE INFORMATION READING APPARATUS WHICH INCORPORATES SUCH SHEET-LIKE MEMBER CLEANING DEVICE

This is a divisional application of Ser. No. 09/813,982 filed Mar. 22, 2001 now U.S. Pat. No. 6,725,776, the entire disclosure of which is incorporated herein by reference.

BACKGROUND OF THE INVENTION

1. Field of the Invention

The present invention relates to a sheet-like member cleaning device for removing dust particles from a sheet-like member that is fed by a feed system, and a radiation image information reading apparatus which incorporates such a sheet-like member cleaning device.

2. Description of the Related Art

A system is known for recording radiation image information of a subject such as a human body with a stimulable phosphor, and reproducing the recorded radiation image information on a photosensitive medium such as a photographic film, or displaying the recorded radiation image information on a display device such as a CRT or the like.

The stimulable phosphor is a phosphor which, when exposed to an applied radiation (X-rays, $\alpha$-rays, $\gamma$-rays, electron beams, ultraviolet radiation, or the like), stores a part of the energy of the radiation, and, when subsequently exposed to applied exciting rays such as visible light, emits light in proportion to the stored energy of the radiation. Usually, a sheet provided with a layer of the stimulable phosphor is used as a stimulable phosphor sheet.

The above known system includes a built-in radiation image information reading apparatus which comprises an imaging unit for recording the radiation image information of a subject on a stimulable phosphor sheet, a reading unit for photoelectrically reading the recorded radiation image information from the stimulable phosphor sheet by applying exciting light to the stimulable phosphor sheet, and an erasing unit for erasing remaining radiation image information from the stimulable phosphor sheet after the radiation image information has been read from the stimulable phosphor sheet. The stimulable phosphor sheet is circulated or moved back and forth in the radiation image information reading apparatus.

Another radiation image information reading apparatus for use in the above system comprises a loading unit for loading therein a cassette or a magazine which houses a stimulable phosphor sheet with the radiation image information of a subject recorded thereon, a reading unit for photoelectrically reading the recorded radiation image information from the stimulable phosphor sheet by applying exciting light to the stimulable phosphor sheet that is removed from the loading unit, and an erasing unit for erasing remaining radiation image information from the stimulable phosphor sheet after the radiation image information has been read from the stimulable phosphor sheet.

In the above radiation image information reading apparatus, the image information read from the stimulable phosphor sheet is liable to suffer an error due to dust particles or foreign matter introduced via the feed system into the reading unit or applied to the stimulable phosphor sheet. Specifically, when dust particles or foreign matter is introduced via the feed system into the reading unit or applied to the stimulable phosphor sheet, it is also read as an image, and makes it difficult for the desired image information to be read accurately. Another problem is that the introduced or applied dust particles or foreign matter causes the feed system to vibrate, and the vibration is transmitted to the reading unit, tending to blur the image read from the stimulable phosphor sheet.

SUMMARY OF THE INVENTION

It is a general object of the present invention to provide a sheet-like member cleaning device for reliably preventing dust particles or foreign matter from entering a feed system for feeding a sheet-like member.

Another object of the present invention is to provide a radiation image information reading apparatus which is capable of reliably preventing dust particles or foreign matter from entering a reading unit to allow the reading unit to read highly accurate image information from a sheet-like member.

Still another object of the present invention is to provide a radiation image information reading apparatus which has means for preventing dust particles floating or deposited in a casing from being applied again to a sheet-like member.

The above and other objects, features, and advantages of the present invention will become more apparent from the following description when taken in conjunction with the accompanying drawings in which preferred embodiments of the present invention is shown by way of illustrative example.

DESCRIPTION OF THE PREFERRED EMBODIMENTS

Figure 1:
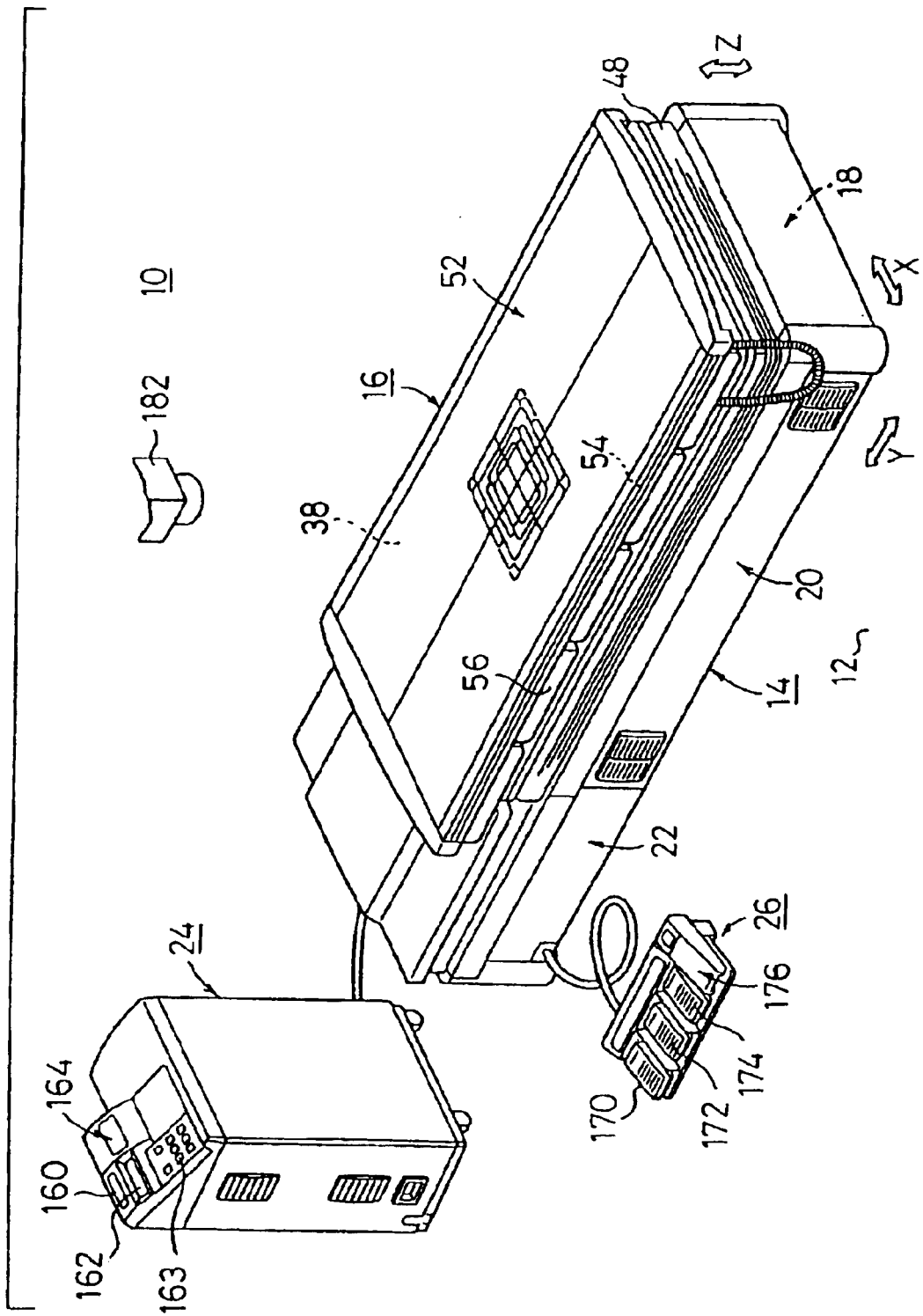
FIG. 1 is a perspective view of a radiation image information reading apparatus which incorporates a sheet-like member cleaning device according to the present invention.

Like or corresponding parts are denoted by like or corresponding reference numerals throughout views.

A radiation image information reading apparatus which incorporates a sheet-like member cleaning device according to the present invention will be described below with reference to the drawings.

Figure 2:
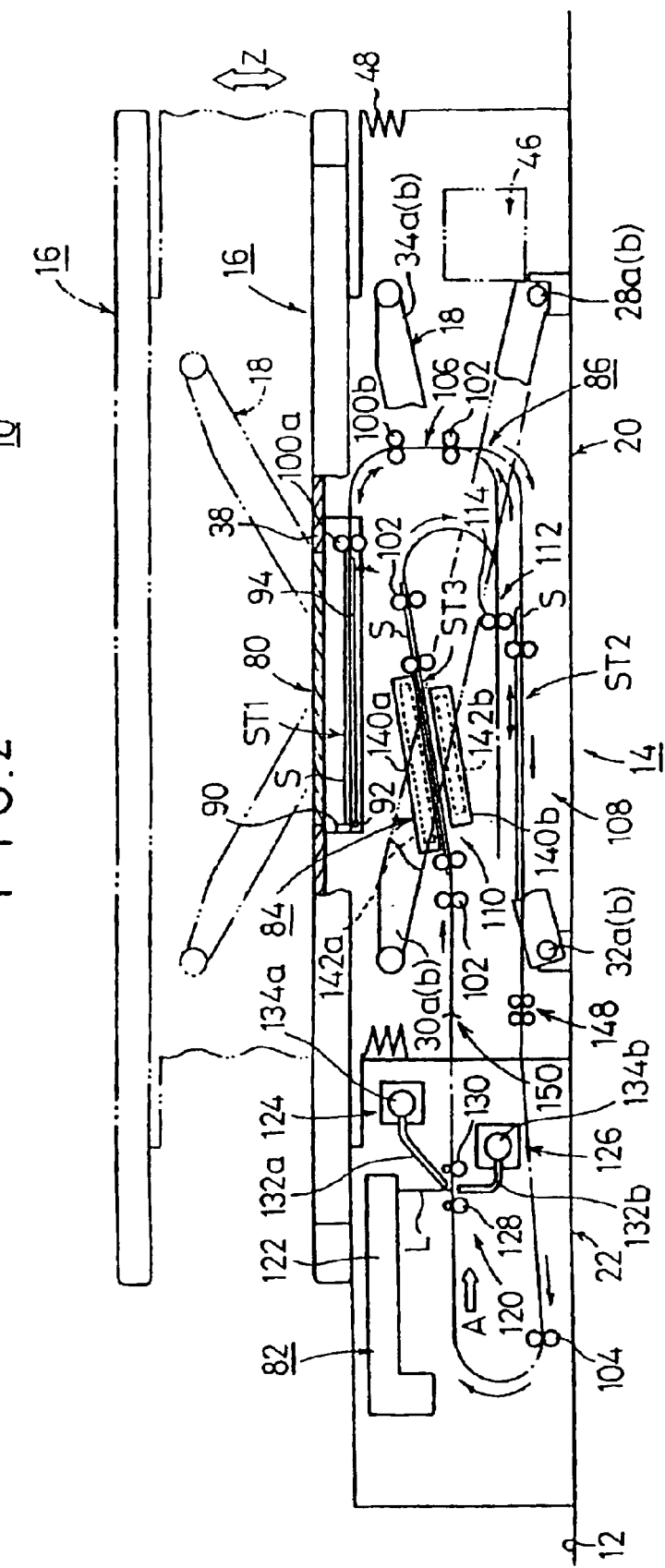
FIG. 2 is a schematic fragmentary side elevational view of an internal structure of the radiation image information reading apparatus.

As shown in FIGS. 1 and 2, a radiation image information reading apparatus 10 comprises a housing 14 placed on a floor or installation surface 12, an imaging bed 16 for supporting a patient, with the back or one side down, directly thereon, and a lifting/lowering mechanism 18 for lifting and lowering the imaging bed 16 with respect to the housing 14. The housing 14 comprises a first casing 20 housing the lifting/lowering mechanism 18 therein and a second casing 22 separate from and adjacent to the first casing 20. A controller 24 and a switch unit 26 are connected to the second casing 22.

Figure 3:
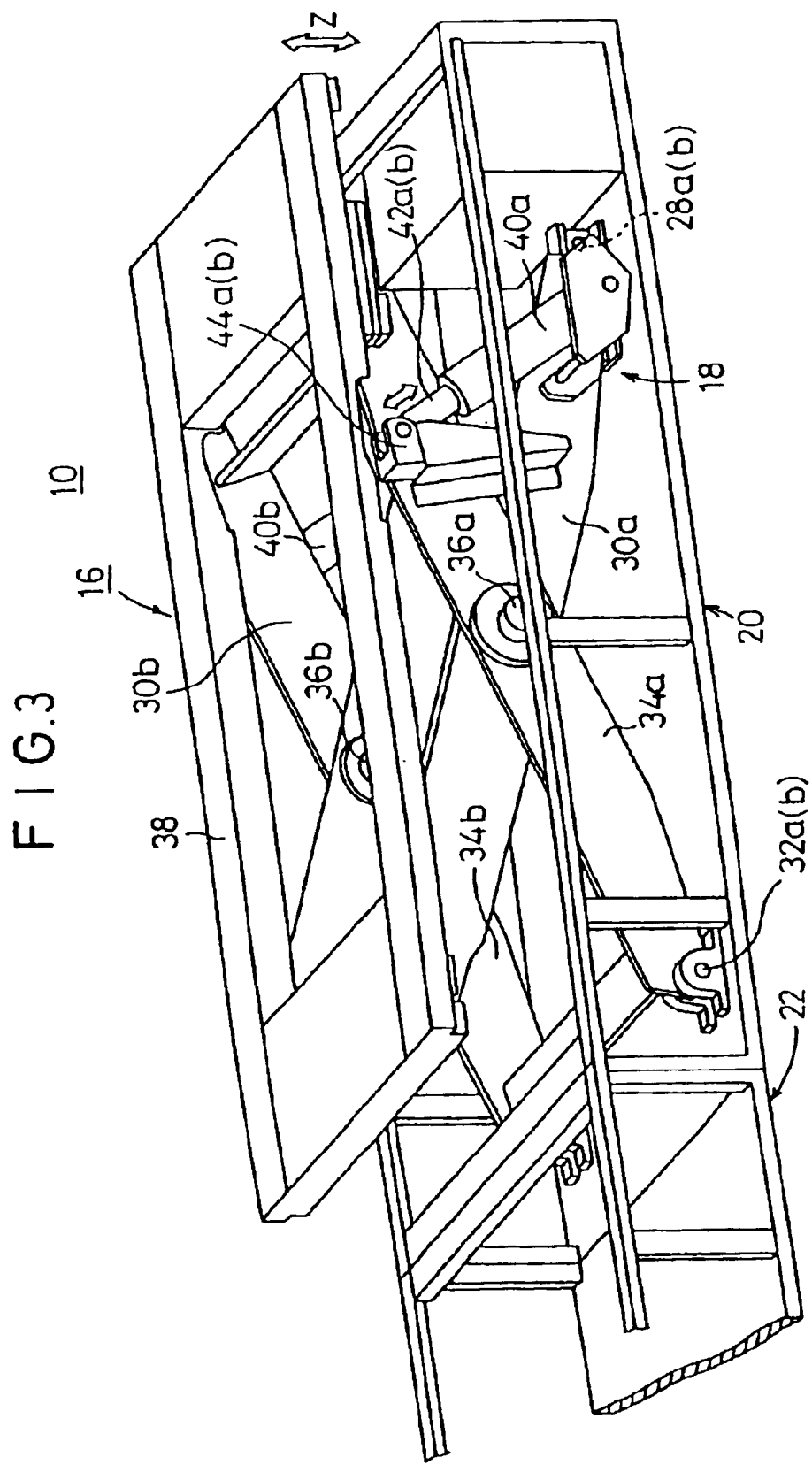
FIG. 3 is a perspective view of an apparatus frame and an exposure bed of the radiation image information reading apparatus.

As shown in FIGS. 2 and 3, the lifting/lowering mechanism 18 comprises a pair of horizontally spaced first swing arms 30a, 30b swingably supported on one end of the first casing 20 remote from the second casing 22 by respective pivot shafts 28a, 28b, and a pair of horizontally spaced second swing arms 34a, 34b swingably supported on the opposite end of the first casing 20 close to the second casing 22 by respective pivot shafts 32a, 32b. The first and second swing arms 30a, 34a and the first and second swing arms 30b, 34b are coupled to each other by respective joint shafts 36a, 36b at substantially central regions thereof. The first swing arms 30a, 30b and the second swing arms 34a, 34b have respective distal ends held in operative engagement with the bottom of a vertically movable base 38 of the imaging bed 16.

Hydraulic cylinders 40a, 40b are mounted respectively on the first swing arms 30a, 30b near the pivot shafts 28a, 28b and have respective rods 42a, 42b extending toward and coupled to the second swing arms 34a, 34b, respectively, by attachments 44a, 44b near upper ends of the second swing arms 34a, 34b. The hydraulic cylinders 40a, 40b are controlled by a hydraulic unit 46 mounted in the first casing 14. The hydraulic unit 46 has a pump and valves for controlling the flow of a fluid to and from the hydraulic cylinders 40a, 40b.

As shown in FIG. 1, a dust-resistant, light-shielding bellows 48 which is vertically expandable and contractible is disposed between and connected to the vertically movable base 38 and the first casing 20. A top table 52 that can be displaced in the transverse directions of the first casing 20 indicated by the arrow X and also in the longitudinal directions indicated by the arrow Y, which are perpendicular to the longitudinal directions indicated by the arrow Y, is mounted on the vertically movable base 38.

Two linear touch switches 54 are fixed to the top panel 52 along the opposite sides thereof. The touch switches 54 are used to turn on and off a lock means, not shown, for locking the top panel 52. While one of the touch switches 54 is being pressed, the lock means unlocks the top panel 52. Covers 56 are mounted on the top panel 52 and positioned outwardly of the touch switches 54.

As shown in FIG. 2, the vertically movable base 38 supports therein a recording unit 80 for temporarily recording radiation image information of a subject on a stimulable phosphor sheet S. The housing 14 houses therein a reading unit 82 for photoelectrically reading the radiation image information recorded on the stimulable phosphor sheet S by applying a laser beam L as simulating light to the stimulable phosphor sheet S, an erasing assembly 84 for erasing remaining radiation image information from the stimulable phosphor sheet S after the recorded image information has been read therefrom, and a circulating feed system (sheet feeding apparatus) 86 for circulating three stimulable phosphor sheets S, for example, in the radiation image information reading apparatus 10.

Figure 4:
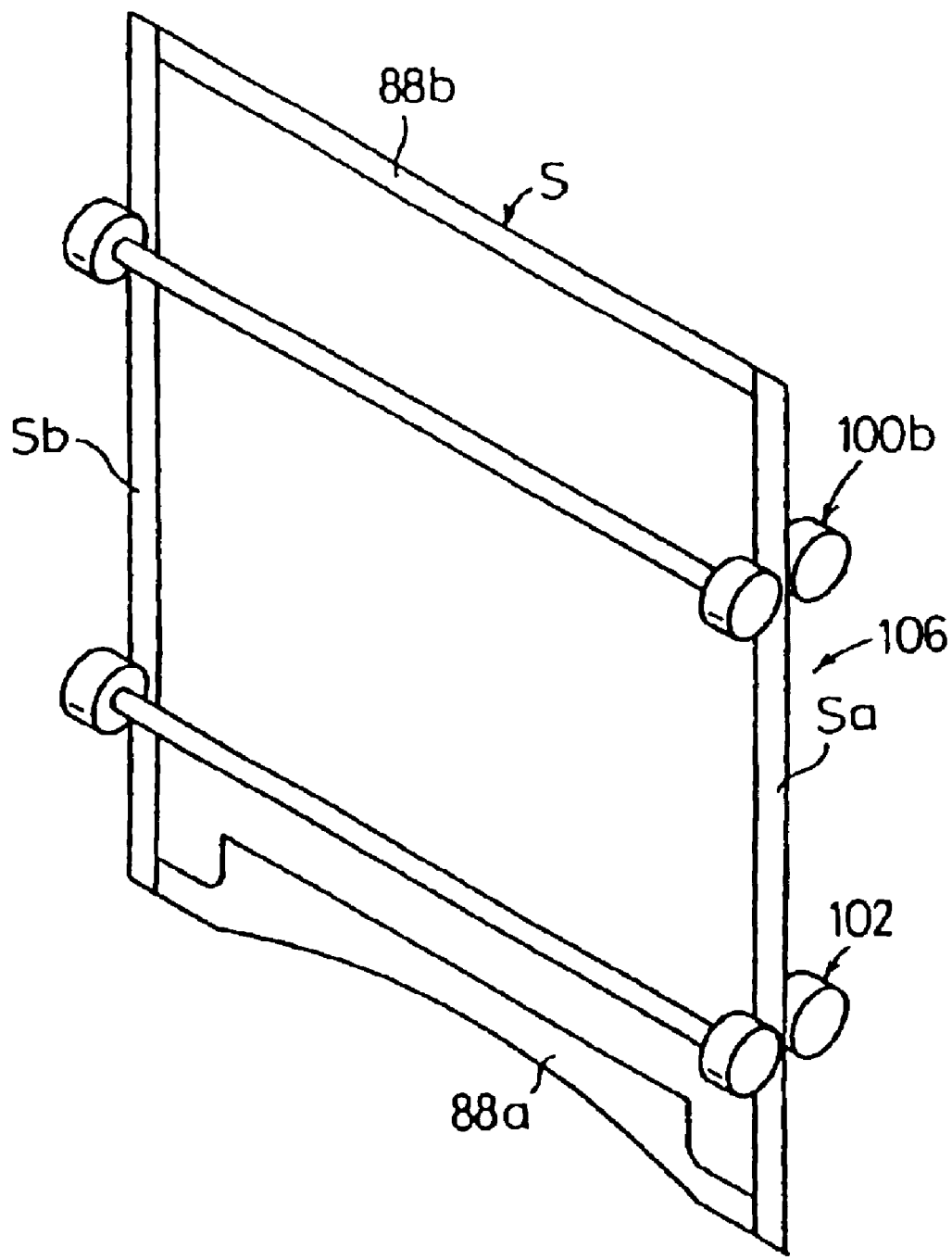
FIG. 4 is a perspective view of a stimulable phosphor sheet.

As shown in FIG. 4, the stimulable phosphor sheet S is gripped only at its opposite marginal edges Sa, Sb when it is fed in circulation. Further, the stimulable phosphor sheet S is fixed to reinforcing plates 88a, 88b at its opposite edges in the feeding direction.

As shown in FIG. 2, the recording unit 80 has a positioning member 90 for positioning the stimulable phosphor sheet S, and a holder plate 94 swingable about a pivot 92 for holding the stimulable phosphor sheet S in position in the recording unit 80. The circulating feed system 86 has a roller pair 100a disposed near an inlet/outlet end of the recording unit 80 remote from the positioning member 90, and a roller pair 100b spaced a given distance from the roller pair 100a. The roller pairs 100a, 100b are supported on the vertically movable base 38 for vertical movement in unison with the vertically movable base 38.

The circulating feed system 86 also has a plurality of roller pairs 102 disposed in the first casing 20. The second casing 22 houses therein a roller pair 104 of another circulating feed system (sheet feeding apparatus) which is independent of the circulating feed system 86. The roller pairs 100a, 100b, 102, 104 grip only the marginal edges Sa, Sb of the stimulable phosphor sheet S to feed the stimulable phosphor sheet S.

The circulating feed system 86 comprises a vertical feed path 106 extending vertically downwardly from the recording unit 80, a horizontal feed path 108 extending horizontally from the lower end of the vertical feed path 106 to the roller pair 104, an inclined feed path 110 turning 180° back from the roller pair 104 and extending through the reading unit 82 to a position beyond the erasing assembly 84, and a switchback feed path 112 turning 180° back from the tip end of the inclined feed path 110 for sheet switch-back and joined to the vertical feed path 106. The circulating feed system 86 includes a reversible roller pair 114 disposed at the switchback feed path 112.

Three stimulable phosphor sheets S are present in the circulating feed system 86 at all times. These stimulable phosphor sheets S can be placed in three standby positions including a first standby position ST1 as a set position in the recording unit 80, a second standby position ST2 disposed in the horizontal feed path 108, and a third standby position ST3 disposed in the erasing assembly 84.

The reading unit 82 is positioned in the second casing 22. The reading unit 82 comprises an auxiliary scanning feed assembly 120 for feeding a stimulable phosphor sheet S in an auxiliary scanning direction which is a horizontal direction indicated by the arrow A, a laser beam radiating device (exciting light radiating means) 122 for applying a laser beam L as exciting light substantially vertically to the stimulable phosphor sheet S as it is fed in the auxiliary scanning direction to scan the stimulable phosphor sheet S in a main scanning direction which is normal to the auxiliary scanning direction, and first and second light collecting systems 124, 126 for photoelectrically reading light that is emitted from the stimulable phosphor sheet S upon application of the laser beam L thereto.

The auxiliary scanning feed assembly 120 has first and second roller pairs 128, 130 that are rotatable in synchronism with each other. The first light collecting system 124 comprises a first light guide 132a having an end which is disposed at a position where the laser beam L is applied to a recording surface of the stimulable phosphor sheet S and extends in the main scanning direction, and a first photomultiplier 134a mounted on the other end of the first light guide 132a. The second light collecting system 126 comprises a second light guide 132b having an end which is disposed on the side of the reverse surface of the stimulable phosphor sheet S and extends in the main scanning direction, and a second photomultiplier 134b mounted on the other end of the second light guide 132b.

The erasing assembly 84 comprises a first erasing unit 140a disposed over the recording surface of the stimulable phosphor sheet S and a second erasing unit 140b disposed over the reverse surface of the stimulable phosphor sheet S. The first and second erasing units 140a, 140b have respective erasing light sources 142a, 142b.

Figure 5:
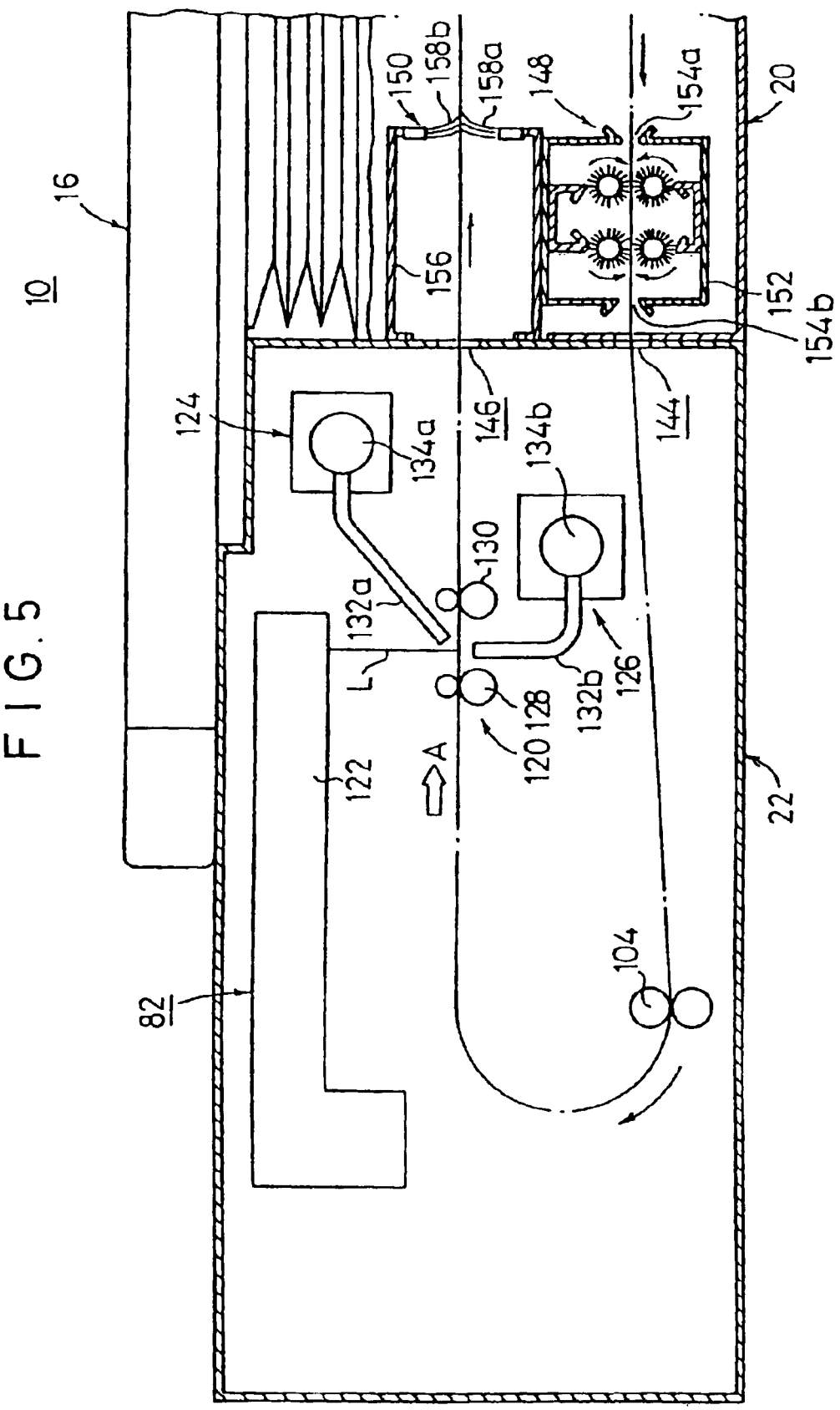
FIG. 5 is a fragmentary vertical cross-sectional view of an internal structure of the radiation image information reading apparatus.

As shown in FIGS. 2 and 5, the first casing 20 and the second casing 22 are individually installed on the floor 12. The first casing 20 houses therein a first cleaning unit 148 and a second cleaning unit 150 which are positioned respectively at an inlet 144 and an outlet 146 that are defined in a wall of the first casing 20. Stimulable phosphor sheets S are introduced from the first casing 20 into the second casing 22 through the inlet 144, and returned from the second casing 22 into the first casing 20 through the outlet 146.

The first cleaning unit 148 has a duct 152 having a first opening 154a defined in an upstream side wall thereof for introducing therethrough a stimulable phosphor sheet S that is fed by the circulating feed system 86 and a second opening 154b defined in a downstream wall thereof for discharging a stimulable phosphor sheet S from the duct 152 toward the reading unit 82.

The second cleaning unit 150 comprises a casing 156 fixedly mounted in the first casing 20 and a pair of brush members 158a, 158b attached to the casing 156 remotely from the outlet 146 for contacting a stimulable phosphor sheet S that passes through the second cleaning unit 150 to prevent dust particles from entering from the first casing 20 into the casing 156.

As shown in FIG. 1, the controller 24 has a control panel 164 which has a plurality of lamps 160, a display panel 162, and a plurality of lamps 163 for indicating a recording size with selector keys. When the controller 24 is turned on by the operator who operates a console (not shown) or a recording size is selected, the lamps 160, 163 indicate such turn-on and recording size information, and the display unit 162 displays the ID number and name of a patient registered via the console or a recording menu.

The switch unit 26 has a first foot switch 170 for unlocking the top panel 52 of the imaging bed 16 for horizontal movement thereof, a second foot switch 172 for lowering the imaging bed 16, a third foot switch 174 for lifting the imaging bed 16, and a fourth foot switch 176 for stopping the imaging bed 16 against vertical movement in case of emergency. An X-ray radiating unit 182 is positioned over the top panel 52.

Figure 6:
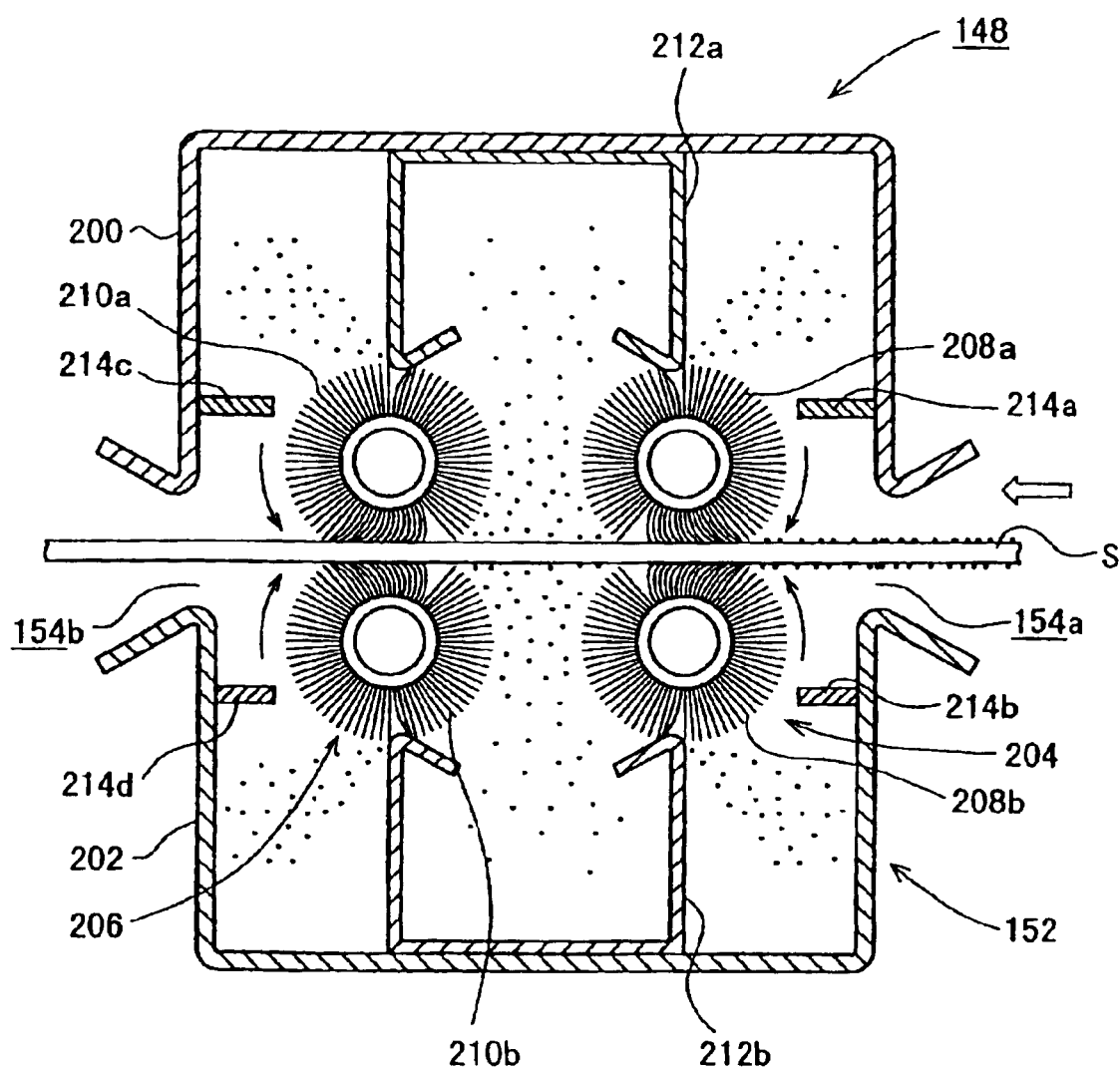
FIG. 6 is a vertical cross-sectional view of a first cleaning unit in the radiation image information reading apparatus.

The first cleaning unit 148 will be described in detail below. As described above, the first cleaning unit 148 has the duct or housing 152. As shown in FIG. 6, the duct 152 comprises an upper housing member 200 and a lower housing member 202 which define therebetween the first opening 154a for introducing the stimulable phosphor sheet S into the duct 152 and the second opening 154b for discharging the stimulable phosphor sheet S from the duct 152 toward the reading unit 82. The duct 152 houses therein a first brush roller pair 204 disposed between the upper housing member 200 and the lower housing member 202 and facing the first opening 154a, and a second brush roller pair 206 disposed downstream of the first brush roller pair 204 between the upper housing member 200 and the lower housing member 202 and facing the second opening 154b. The first brush roller pair 204 comprises a first brush roller 208a and a second brush roller 208b which are disposed parallel to each other with their brush bristles having distal ends held in contact with each other. Similarly, the second brush roller pair 206 comprises a third brush roller 210a and a fourth brush roller 210b which are disposed parallel to each other with their brush bristles having distal ends held in contact with each other. The first brush roller pair 204 and the second brush roller pair 206 have their axes extending parallel to each other and perpendicularly to the direction in which the stimulable phosphor sheet S is fed through the duct 152.

The first cleaning unit 148 has a first dust removing plate (first dust removing means) 212a bent into a channel shape and having an upper surface fixed to an upper inner surface of the upper housing member 200. The first dust removing plate 212a has lower tip ends held against bristles of the first brush roller 208a and the third brush roller 210a. The first cleaning unit 148 also has a second dust removing plate (second dust removing means) 212b bent into a channel shape and having a lower surface fixed to a lower inner surface of the lower housing member 202. The second dust removing plate 212b has upper tip ends held against bristles of the second brush roller 208b and the fourth brush roller 210b.

If necessary, pairs of plates 214a, 214b and plates 214c, 214d may be mounted in the duct 152 in the vicinity of the first opening 154a and the second opening 154b, respectively, for preventing dust particles from being discharged from the duct 152 out of the first opening 154a and the second opening 154b.

Figure 7:
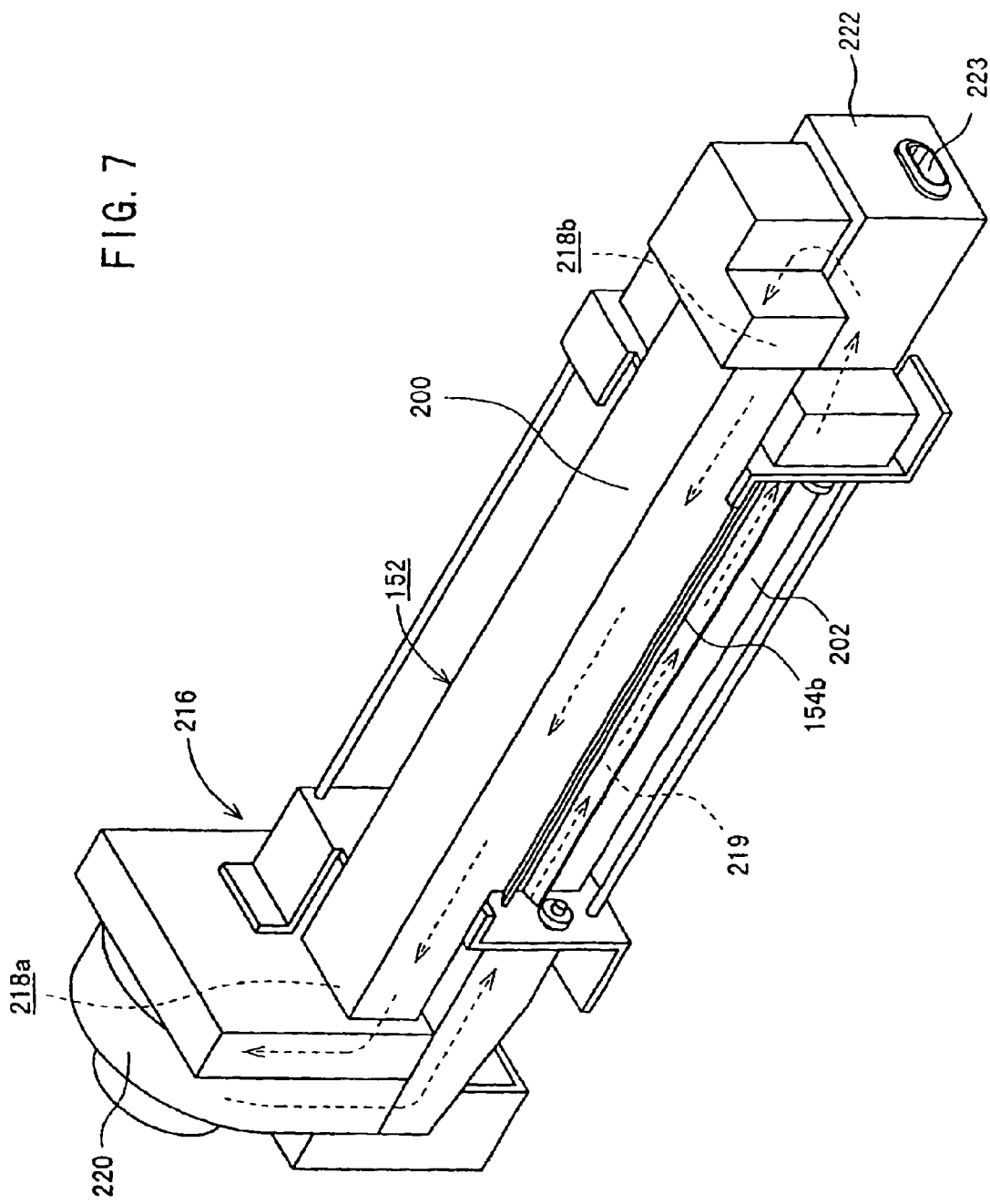
FIG. 7 is a perspective view of an assembly of the first cleaning unit shown in FIG. 6, a multiblade fan, and a filter box.

As shown in FIG. 7, the first cleaning unit 148 also has an air flow generating means 216 combined with the duct 152 for generating an air flow in the duct 152. The air flow generating means 216 comprises a multiblade fan 220 as an air suction unit communicating with an air outlet 218a defined in a longitudinal end of the duct 152, a filter box 222 as an air discharge unit communicating with an air inlet 218b defined in an opposite longitudinal end of the duct 152, and a flow path 219 as an air passage in the duct 152. Dust particles which are drawn by the multiblade fan 220 through the duct 152 can be delivered via the flow path 219 to the filter box 222. The filter box 222 houses a filter, not shown, which traps the dust particles, and discharges purified air out of the first cleaning unit 148. Alternatively, the purified air is not discharged out of the first cleaning unit 148 and used again in the first cleaning unit 148 so that the air can circulate through the flow path 219 in the duct 152. The filter box 222 preferably has a discharge port 223 defined therein. Filtered air produced by the filter in the filter box 222 is circulated through the duct 152 and partly discharged from the discharge port 223, allowing air to be drawn from the first opening 154a and the second opening 154b into the duct 152 to gather dust particles in the duct 152. If the possibility of dust particles attached to the stimulable phosphor sheet S is small, then the first brush roller pair 204 and the second brush roller pair 206 may be dispensed with, and only the multiblade fan 220 and the filter box 222 may be employed. When the filter in the filter box 222 is loaded with dust particles, then the filter box 222 may be removed and cleaned.

Figure 8:
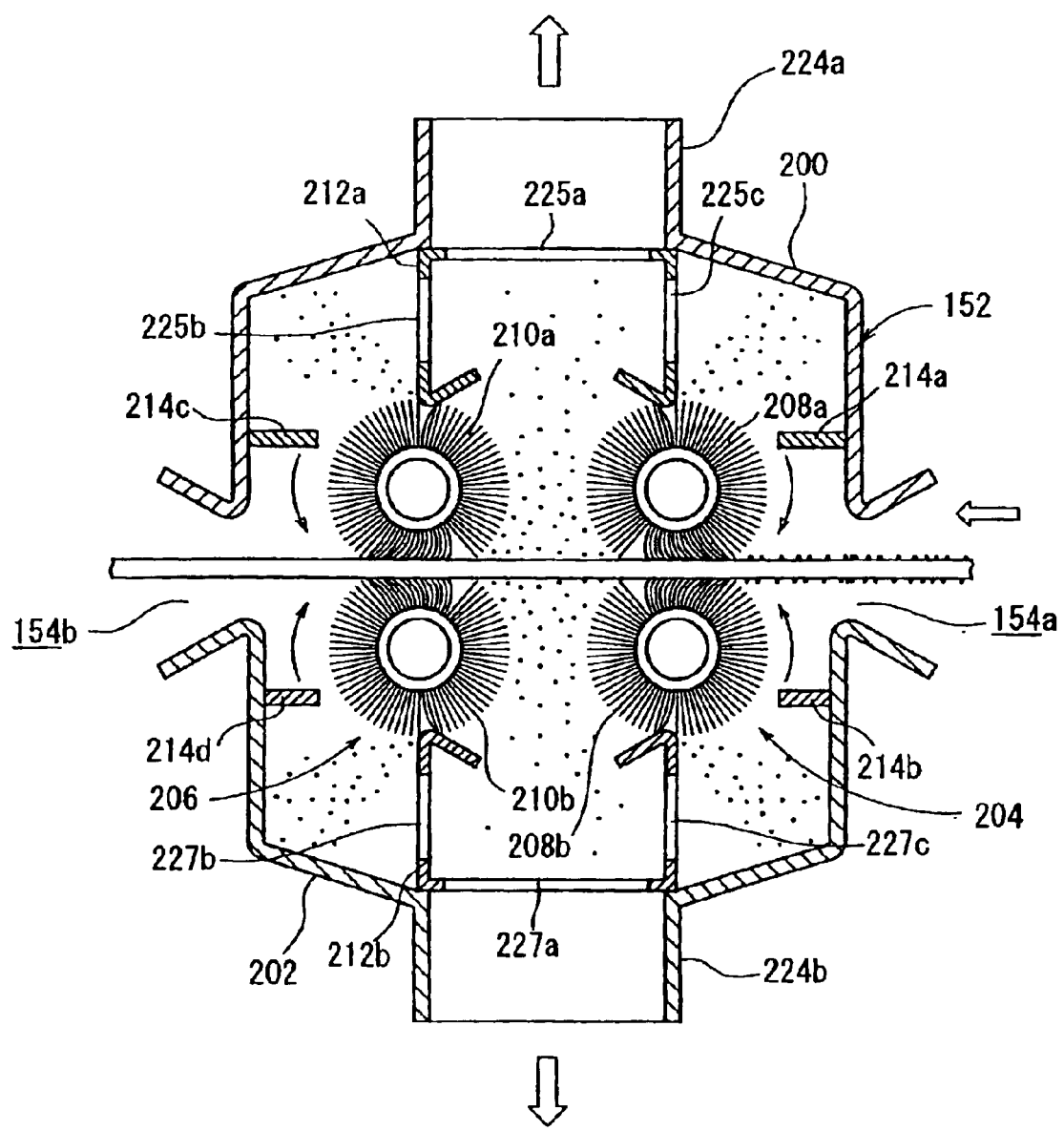
FIG. 8 is a vertical cross-sectional view of a first cleaning unit according to another embodiment of the present invention.

FIG. 8 shows a first cleaning unit according to another embodiment of the present invention. The first cleaning unit shown in FIG. 8 has an air outlet port 224a defined in an upper panel of the upper housing member 200 and an air outlet port 224b defined in a lower panel of the lower housing member 202. Air that is forcibly introduced by a multiblade fan coupled to the duct 152 is discharged from the duct 152 through the air outlet ports 224a, 224b in directions perpendicular to the longitudinal direction of the duct 152. Ducts, not shown, may be connected to the respective air outlet ports 224a, 224b. The first dust removing plate 212a which is disposed across the air outlet 224a has a plurality of holes 225a, 225b, 225c for discharging dust particles therethrough into the outlet 224a. Similarly, the second dust removing plate 212b which is disposed across the air outlet port 224b has a plurality of holes 227a, 227b, 227c for discharging dust particles therethrough into the air outlet port 224b.

Figure 9:
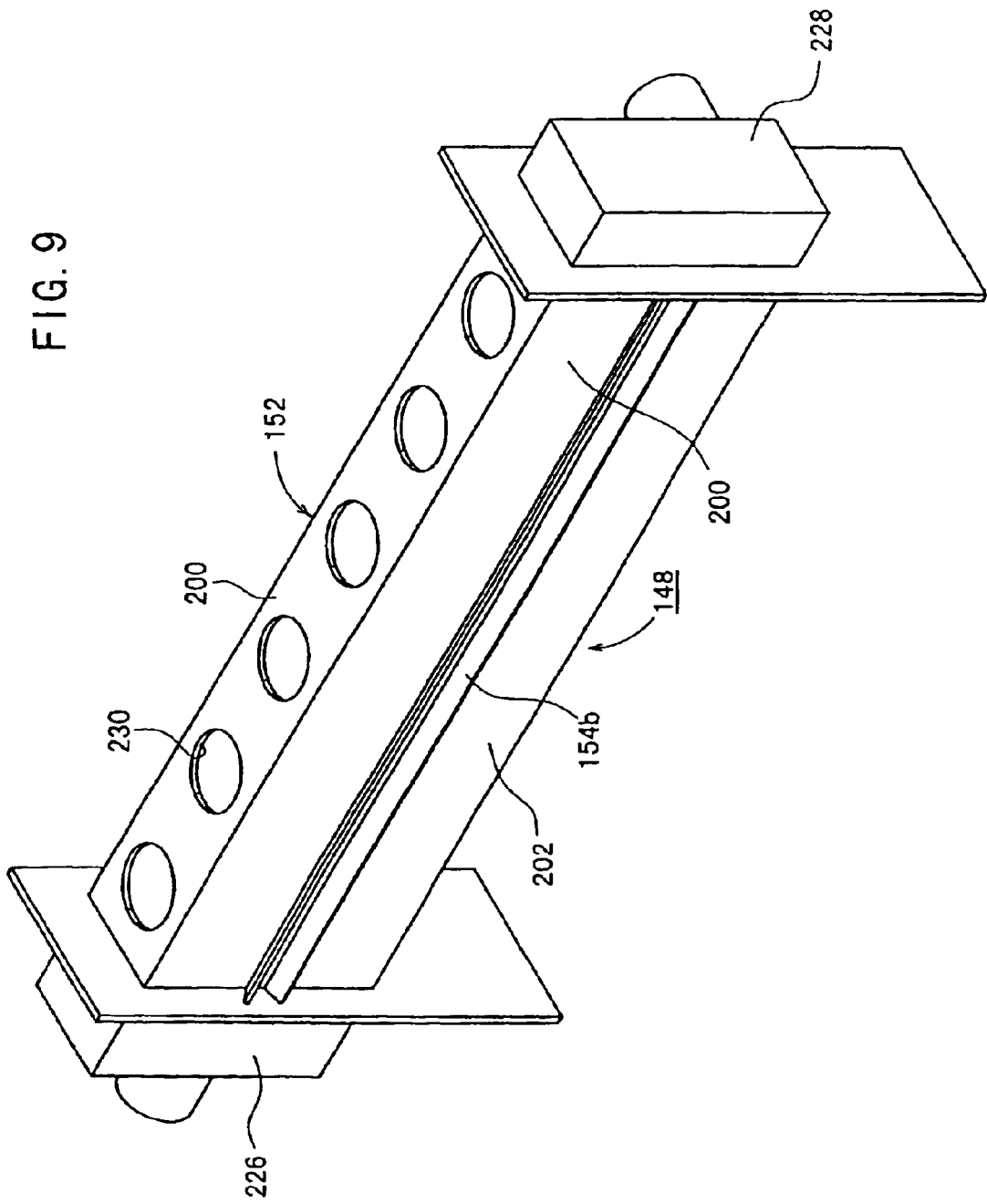
FIG. 9 is a perspective view of a first cleaning unit according to still another embodiment of the present invention, with an air inlet, an air outlet, and air outlet ports defined in housing members of the first cleaning unit.

FIG. 9 shows a first cleaning unit according to still another embodiment of the present invention. The first cleaning unit shown in FIG. 9 has an air inlet 226 defined in a side panel of the upper and lower housing members 200, 202, an air outlet 228 defined in an opposite side panel thereof, and a plurality of air outlet ports 230 defined in panels of the upper and lower housing members 200, 202 which extend perpendicularly to the longitudinal direction thereof. Ducts, not shown, are mounted on the upper and lower housing members 200, 202 in covering relation to the air outlet ports 230 for discharging dust particles from the duct 152.

Figure 11:
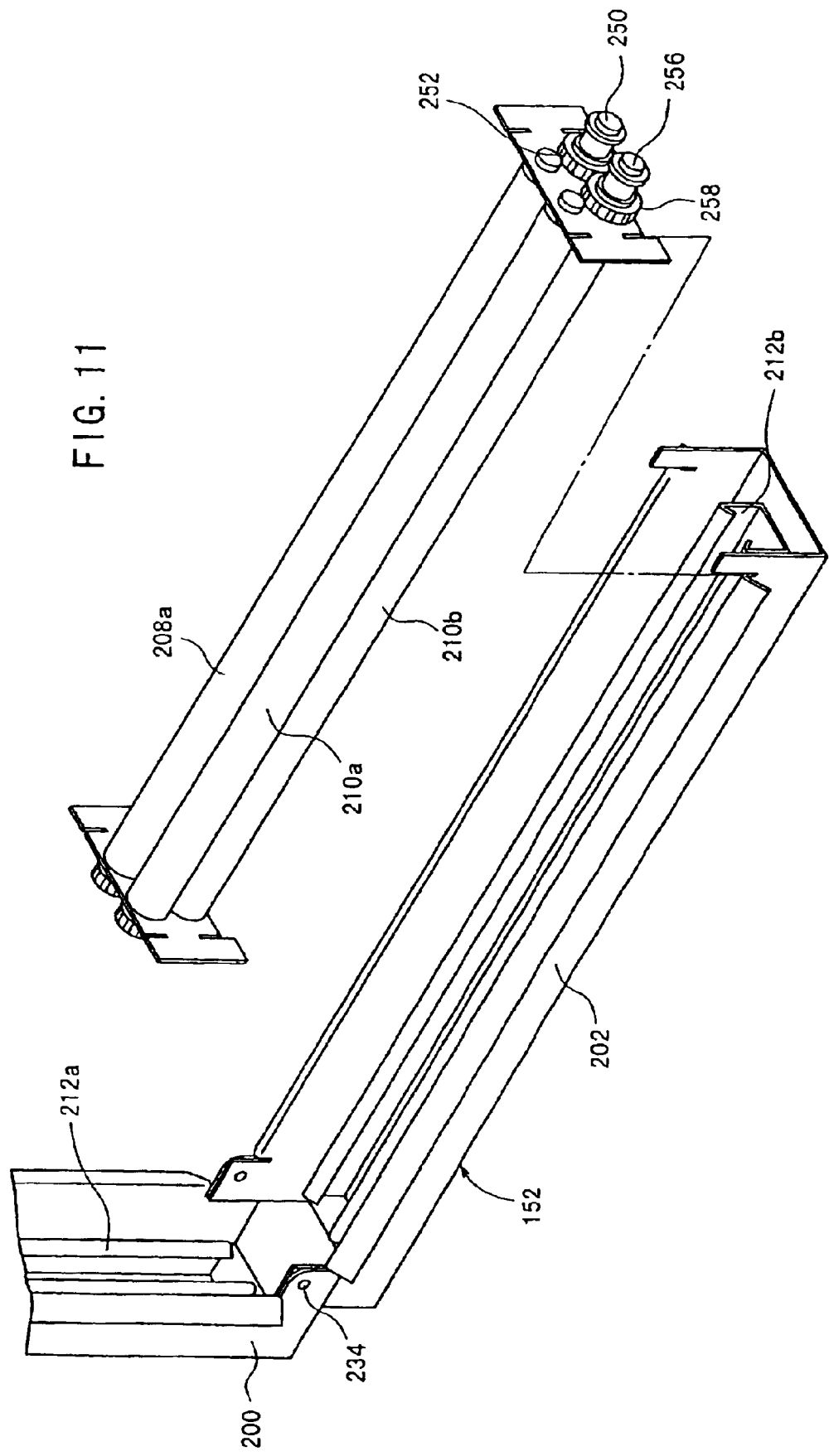
FIG. 11 is a perspective view showing the manner in which an upper housing member is opened away from a lower housing member thereof, and brush roller pairs are removed.

As shown in FIG. 11, the upper housing member 200 is angularly movably coupled to the lower housing member 202 by a shaft 234 at longitudinal ends thereof. When the upper housing member 200 is swung open away from the lower housing member 202 about the shaft 234, the first roller pair 204 and the second roller pair 206 can be removed as a unit from the duct 152 for easy maintenance of the brush rollers 208a, 208b, 210a, 210b for cleaning, repair, replacement, etc.

Figure 10:
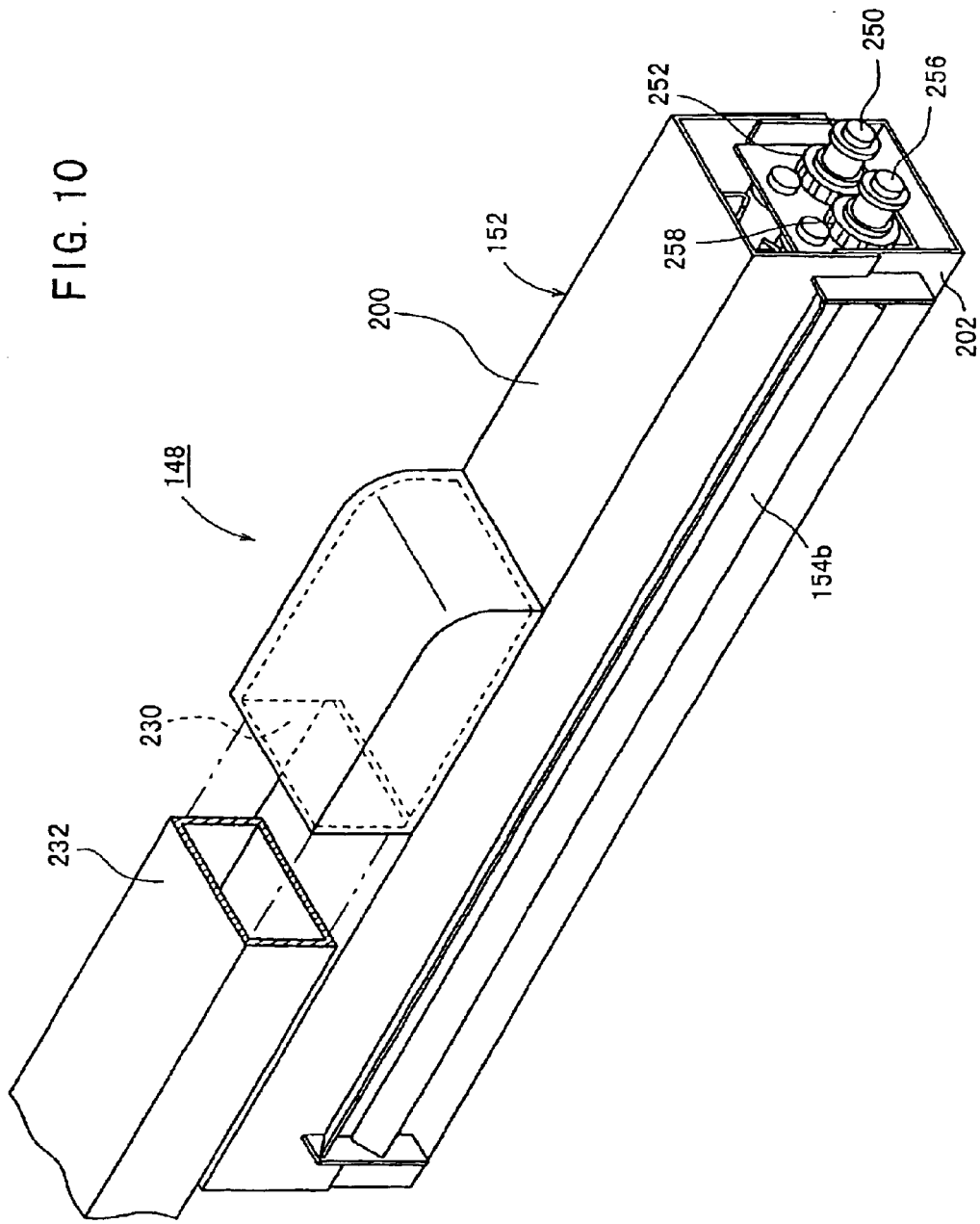
FIG. 10 is a perspective view of a first cleaning unit according to yet another embodiment of the present invention, with a duct mounted on a housing member of the first cleaning unit for discharging dust particles from the housing member.

FIG. 10 shows a first cleaning unit according to yet another embodiment of the present invention. In FIG. 10, the upper housing member 200 has a relatively large single air outlet port 230 defined in an upper panel thereof, and a duct 232 is positioned in facing relation to the air outlet port 230. A fan, not shown, is disposed in the duct 232 for discharging dust particles from the duct 152 via the air outlet port 230 and the duct 232.

Figure 12:
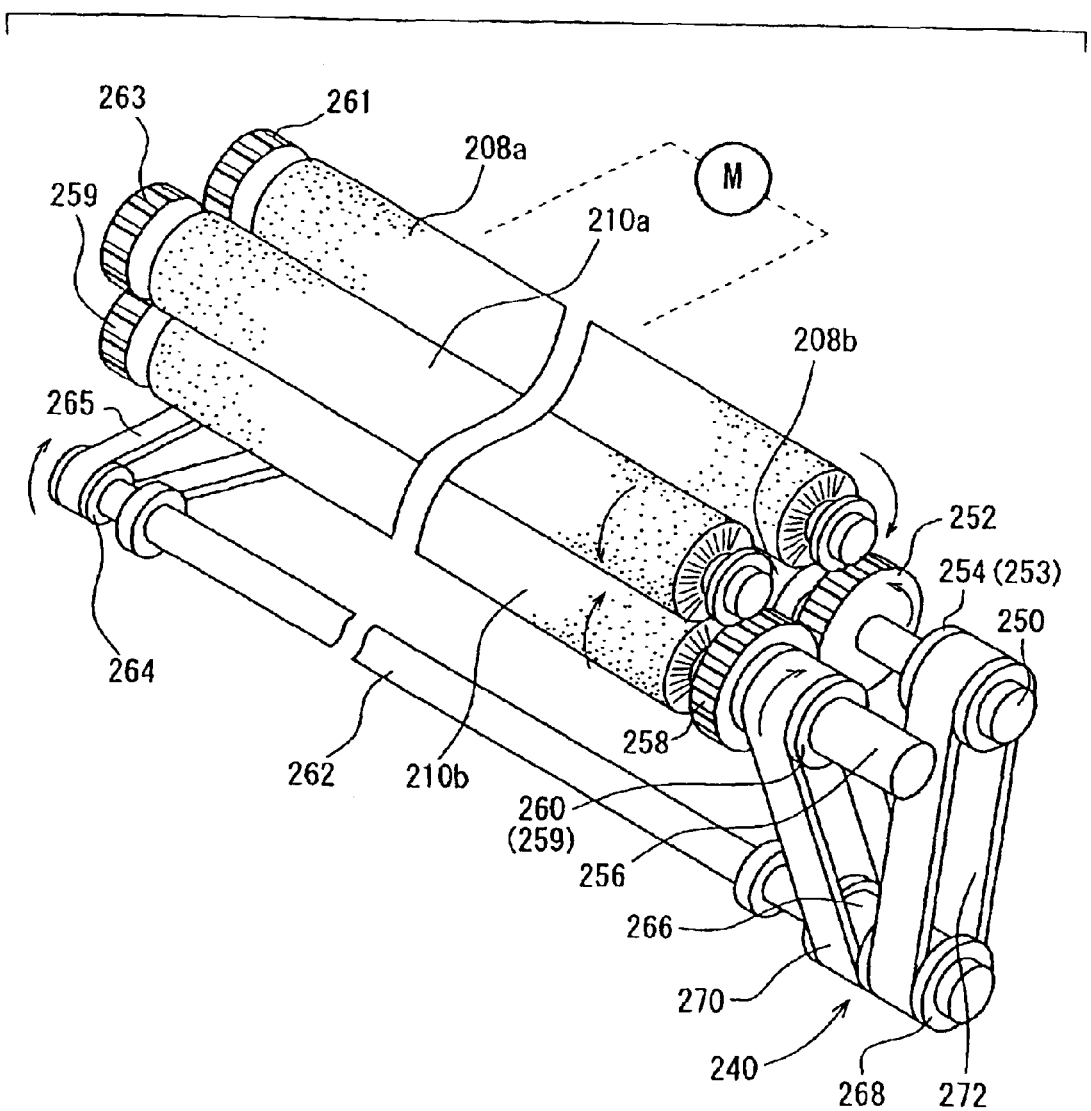
FIG. 12 is a perspective view showing the relationship between an assembly of brush roller pairs and a drive source.

FIG. 12 shows in perspective the first roller pair 204, the second roller pair 206, and a drive means 240 for actuating the first roller pair 204 and the second roller pair 206. The second brush roller 208b has a shaft 250 with a gear 252 mounted on an end thereof and another gear, not shown, mounted on an opposite end thereof. A first pulley 254 is also mounted on the end of the shaft 250 axially outwardly of the gear 252. Similarly, the fourth brush roller 210b has a shaft 256 with a gear 258 mounted on an end thereof and another gear 259 mounted on an opposite end thereof. A second pulley 260 is also mounted on the end of the shaft 256 axially outwardly of the gear 258. The gears 252, 258 are kept in mesh with each other. A gear 261 is mounted on an end of the first brush roller 208a, and a gear 263 is mounted on an end of the third brush roller 210a. The gear 261 is held in mesh with the gear on the opposite end of the shaft 250. The gear 259 is held in mesh with the gear 263.

A drive shaft 262 which can be rotated by a motor M, not shown, supports on an end thereof a third pulley 264 that is operatively coupled to the drive shaft of the motor by a belt 265. The other end of the drive shaft 262 supports thereon a fourth pulley 266 and a fifth pulley 268. A first belt 270 is trained around the second pulley 260 and the fourth pulley 266, and a second belt 272 is trained around the first pulley 254 and the fifth pulley 268. One-way clutches 253, 259 are incorporated as clutch means respectively in the first pulley 254 and the second pulley 260. These one-way clutches 253, 259 transmit rotational power when the first pulley 254 and the second pulley 260 rotate in only one direction, and do not transmit rotational power when they rotate in the other direction. When the drive shaft 262 is rotated in the direction indicated by the arrow by the motor via the belt 265 and the pulley 264, the fourth brush roller 210b is rotated by the first belt 270 in the direction indicated by the arrow (see also FIG. 6). The second brush roller 208b is rotated by the gear 252 meshing with the gear 258 in the direction indicated by the arrow, which is opposite to the direction in which the fourth brush roller 210b is rotated. The gear 263 meshing with the gear 259 rotates the third brush roller 210a in the direction opposite to the direction in which the fourth brush roller 210b is rotated. When the drive shaft 262 is rotated in the reverse direction, i.e., in the direction opposite to the direction indicated by the arrow, the rotational power is transmitted to the shaft 250 via the second belt 272 to rotate the second brush roller 208b, i.e., the gear 252 is rotated in the direction indicated by the arrow. The gear 258 meshing with the gear 252 rotates the fourth brush roller 210b in the direction indicated by the arrow, which is opposite to the direction in which the second brush roller 208b is rotated. The gear 261 meshing with the non-illustrated gear coupled to the second brush roller 208b rotates the first brush roller 208a in the direction indicated by the arrow, which is opposite to the direction in which the third brush roller 210a is rotated. Therefore, as shown in FIG. 6, the first brush roller pair 204 and the second brush roller pair 206 are rotated to gather dust particles in a central region in the duct 152.

As described above, when the drive shaft 262 is rotated in the direction indicated by the arrow in FIG. 12, the rotational power of the drive shaft 262 is transmitted to the gear 258 via the first belt 258, since the one-way clutch 259 in the second pulley 260 can transmit the rotational power to the shaft 256. At this time, the first belt 270 and the second belt 272 are rotated in the same direction. However, the one-way clutch 253 in the first pulley 254 does not transmit the rotational power from the second belt 272 to the shaft 254. Therefore, the rotational power of the drive shaft 262 is not transmitted to the gear 252. When the drive shaft 262 is rotated in the direction opposite to the direction indicated by the arrow, the rotational power of the drive shaft 262 is transmitted to the gear 252 via the second belt 272 and the gear 252 is rotated in the direction indicated by the arrow, since the one-way clutch 253 in the first pulley 254 can transmit the rotational power to the shaft 250. Thus, the gear 258 meshing with the gear 252 is also rotated in the direction indicated by the arrow. The one-way clutches 253, 259 incorporated in the first and second pulleys 254, 260 prevent the first brush roller 208a, the second brush roller 208b, the third brush roller 210a, and the fourth brush roller 210b from rotating in directions opposite to the directions indicated by the arrows regardless of the rotational direction of the drive shaft 262.

Figure 13:
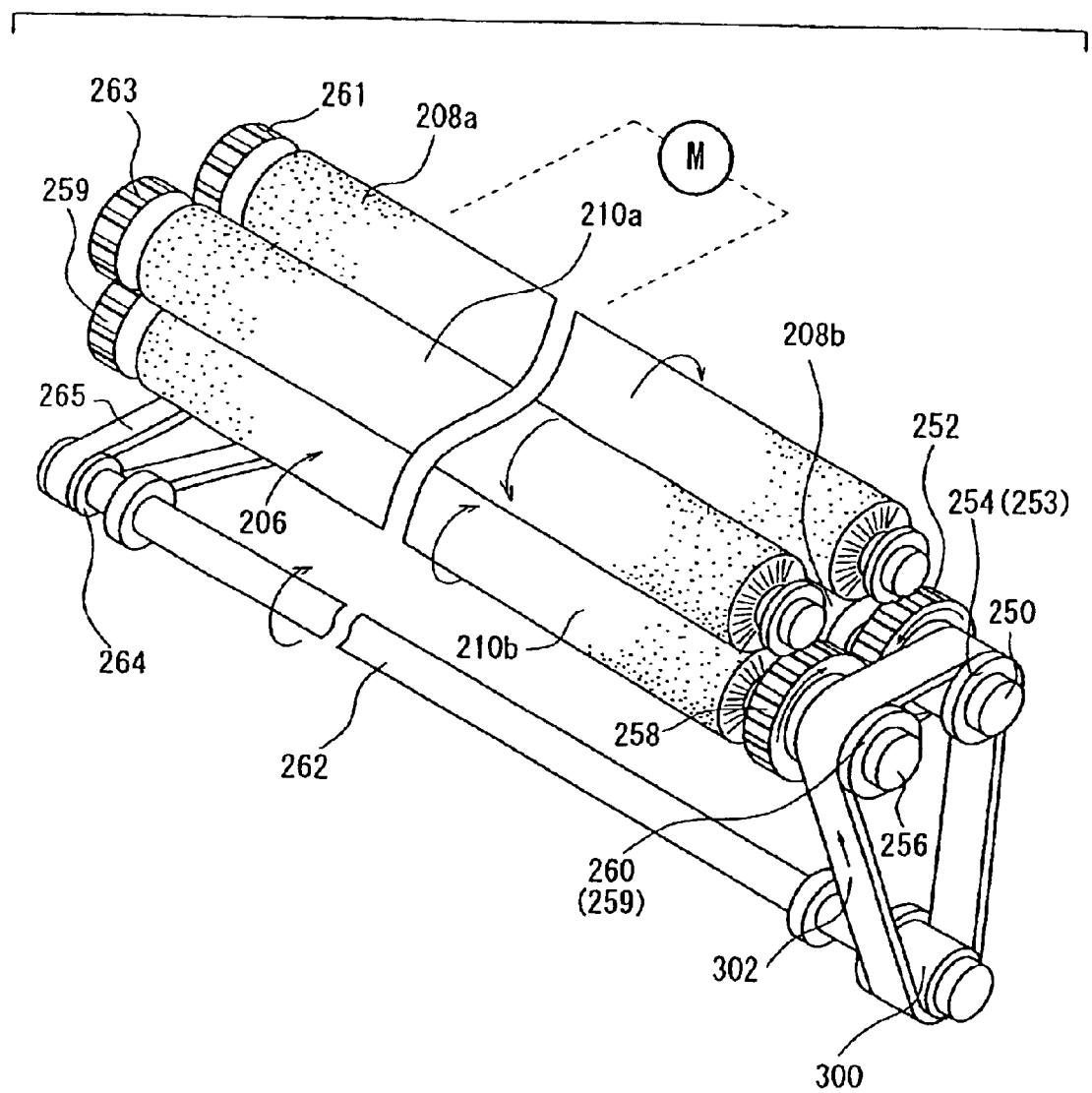
FIG. 13 is a perspective view showing the relationship between an assembly of brush roller pairs and a drive source according to another embodiment of the present invention.

FIG. 13 shows in perspective an assembly of the first and second brush roller pairs 204, 206 and the drive means 240 according to another embodiment of the present invention. Those parts of the assembly which are identical to those shown in FIG. 12 are denoted by identical reference characters, and will not be described in detail below. In the embodiment shown in FIG. 13, a single pulley 300 is mounted on the drive shaft 262, a pulley 254 which incorporates a one-way clutch 253 is mounted on the shaft 250, and a pulley 260 which incorporates a one-way clutch 259 is mounted on the shaft 256. A belt 302 is trained around the pulleys 254, 260, 300.

When the drive shaft 262 is rotated in the direction indicated by the arrow in FIG. 13, the belt 302 is rotated in the direction indicated by the arrow via the pulley 300. The rotational power of the belt 302 is transmitted to the gear 258, since the one-way clutch 259 in the pulley 260 transmit the rotational power to the shaft 256. Thus, the gear 258, the gear 252 in mesh with the gear 258, the first brush roller 208a, the second brush roller 208b, the third brush roller 210a, and the fourth brush roller 210b are rotated in the directions indicated by the arrows, respectively. At this time, the one-way clutch 253 in the pulley 254 does not transmit the rotational power to the shaft 250.

When the drive shaft 262 is rotated in the reverse direction, i.e., in the direction opposite to the direction indicated by the arrow, the rotational power of the pulley 300 is transmitted to the shaft 250, since the one-way clutch 253 in the pulley 254 transmits the rotational power to the shaft 250. Thus, the gear 252 is rotated, and the gear 258 in mesh with the gear 252 is rotated in the direction indicated by the arrow. As a result, the first brush roller 208a, the second brush roller 208b, the third brush roller 210a, the fourth brush roller 210b are rotated in the directions indicated by the arrows, respectively.

That is, regardless of the rotational direction of the drive shaft 262, it is possible to keep the rotational directions of the first roller pair 204 and the second roller pair 206 so that dust particles can be gathered in the central region in the duct 152 all the time as shown in FIG. 6.

Operation of the radiation image information reading apparatus 10 will be described below.

An ID card carrying ID information of a patient, including an ID number and a name, is prepared, and read by the console. The console selects an imaging area, such as a chest or an abdomen, of the patient, and a recording menu. Then, a recording size is selected, if necessary. Then, the patient as a subject to be imaged is placed on the imaging bed 16.

At this time, the vertical position of the imaging bed 16 in the direction indicated by arrow Z is adjusted depending on the condition of the patient, the height of the patient, and the carriage, such as a wheelchair, a stretcher, or the like, by which the patient has been carried. Specifically, the operator presses the second foot switch 172 to cause the hydraulic unit 46 of the lifting/lowering mechanism 18 to operate the hydraulic cylinders 40a, 40b (see FIG. 3). The rods 42a, 42b of the hydraulic cylinders 40a, 40b are retracted to swing the second swing arms 34a, 34b, which are coupled to the rods 42a, 42b by the attachment 44a, 44b, downwardly about the pivot shafts 32a, 32b.

Since the first swing arms 30a, 30b are coupled to the second swing arms 34a, 34b by the joint shafts 36a, 36b, when the second swing arms 34a, 34b are turned downwardly, the first swing arms 30a, 30b are angularly moved downwardly about the pivot shafts 28a, 28b. Therefore, the vertically movable base 38 is moved downwardly to lower the imaging bed 16.

When the operator presses the third foot switch 174, the hydraulic unit 46 actuates the hydraulic cylinders 40a, 40b in the opposite direction. Therefore, the vertically movable base 38 supported by the first swing arms 30a, 30b and the second swing arms 34a, 34b is elevated, thus lifting the imaging bed 16.

In this manner, the imaging bed 16 is adjusted to a vertical position where the patient can easily be placed onto the top panel 52. After the patient is placed on the top panel 52 with the back or one side down, the operator selectively presses the second foot switch 172 or the third foot switch 174 to adjust the vertical position of the top panel 52 for easy subsequent imaging operation. The operator further presses the first foot switch 170 or continuously turns on one of the touch switches 54 on the top panel 52 to unlock the top panel 52.

With the touch switch 54 being continuously pressed, the operator slides the top panel 52 in the directions indicated by the arrows X, Y to adjust the position of the patient until the imaging area of the patient enters a radiating range of the X-ray radiating unit 182. After the imaging area of the patient is positioned, the operator releases the touch switch 54 to lock the top panel 52.

The X-ray radiating unit 182 is then energized to record radiation image information of the patient on a stimulable phosphor sheet S in the recording unit 80. At this time, the other two stimulable phosphor sheets S are placed in the second and third standby positions ST2, ST3, respectively.

When the roller pair 100a of the circulating feed system 86 is rotated, the stimulable phosphor sheet S which has recorded the radiation image information is gripped at its marginal edges Sa, Sb by the roller pair 100a and removed from the recording unit 80. The stimulable phosphor sheet S is then gripped by the roller pairs 100b, 102 and transferred from the vertical feed path 106 into the horizontal feed path 108 (see FIG. 4). Then, the stimulable phosphor sheet S is fed from the first casing 20 into the second casing 22 by the roller pairs 102a, 102b, and turned 180° above the horizontal feed path 108 by the roller pair 104 and fed into the auxiliary scanning feed assembly 120 of the reading unit 82.

In the auxiliary scanning feed assembly 120, the first and second roller pairs 128, 130 are synchronously rotated by a motor (not shown). The stimulable phosphor sheet S is gripped at its marginal edges Sa, Sb by the first and second roller pairs 128, 130 and fed in the auxiliary scanning direction indicated by the arrow A. At this time, the laser beam L is emitted from the laser beam radiating device 122 and applied to the recording surface of the stimulable phosphor sheet S to scan the stimulable phosphor sheet S in the main scanning direction.

When irradiated by the laser beam L, the recording surface of the stimulable phosphor sheet S emits light which represents the recorded radiation image information. The emitted light is photoelectrically read by the first light collecting system 124. Light that has passed through a transparent base of the stimulable phosphor sheet S is emitted from the reverse surface thereof, and photoelectrically read by the second light collecting system 126.

The stimulable phosphor sheet S, from which the recorded radiation image information has been read, is fed from the second casing 22 back into the first casing 20, and delivered along the inclined feed path 110 into the erasing assembly 84. In the erasing assembly 84, the erasing light sources 142a, 142b of the first and second erasing units 140a, 140b apply erasing light to the both surfaces of the stimulable phosphor sheet S to erase unwanted remaining radiation image information from the stimulable phosphor sheet S.

After the remaining radiation image information has been erased from the stimulable phosphor sheet S, the stimulable phosphor sheet S is turned 180° below the inclined feed path 110 and delivered into the switchback feed path 112. The roller pair 114 on the switchback feed path 112 is reversed to feed the stimulable phosphor sheet S from the switchback feed path 112 into the vertical feed path 106, along which the stimulable phosphor sheet S is delivered by the roller pairs 100a, 100b into the recording unit 80.

Operation of the mechanism in the duct 152 of the first cleaning unit 148 will be described in detail below. When the stimulable phosphor sheet S is introduced into the duct 152, the pulley 264 is rotated in the direction indicated by the arrow (see FIG. 12), the first pulley 254 and the second pulley 260 are rotated in the opposite directions by the first belt 270 and the second belt 272, respectively. The first brush roller 208a and the second brush roller 208b are rotated in the same direction as the direction in which the stimulable phosphor sheet S is fed, and the third brush roller 210a and the fourth brush roller 210b are rotated in the opposite direction to the direction in which the stimulable phosphor sheet S is fed. Dust particles attached to the stimulable phosphor sheet S are scraped off and gathered in the central region in the duct 152 by the first through the fourth brush rollers 208a, 208b, 210a, 210b. In the assembly shown in FIG. 7, when the multiblade fan 220 is actuated, dust particles gathered in the central region in the duct 152 are delivered into the filter box 222 in the directions indicated by the broken-line arrows. Specifically, the dust particles are delivered through the duct 152 to the multiblade fan 220, from which they are sent via the flow path 219 into the filter box 22 where they are trapped by the filter. Air from which the dust particles are removed is then partly delivered into the duct 152 and discharged out of the filter box 222 via the discharge port 223. Therefore, the dust particles are effectively removed from the stimulable phosphor sheet S and prevented from being attached again to the stimulable phosphor sheet S. The dust particles that are attached to the bristles of the first through the fourth brush rollers 208a, 208b, 210a, 210b are removed therefrom when the tip ends of the bristles of the first through the fourth brush rollers 208a, 208b, 210a, 210b are engaged by the first and second dust removing plates 212a, 212b. The removed dust particles are then drawn through the duct 152 by the multiblade fan 220 and delivered to the filter box 222, as described above.

The first and second brush rollers 208a, 208b of the first brush roller pair 204 may be rotated at a speed higher than the speed at which the stimulable phosphor sheet S is fed, in order to scrap off dust particles efficiently from the surfaces of the stimulable phosphor sheet S. Stated otherwise, the difference between the speeds of the stimulable phosphor sheet S and the first brush roller pair 204 is effective to remove dust particles from the surfaces of the stimulable phosphor sheet S. The third and fourth brush rollers 210a, 210b of the second brush roller pair 206 should preferably be rotated at a speed lower than the speed at which the stimulable phosphor sheet S is fed for effectively removing dust particles.

In the embodiment shown in FIG. 8, dust particles discharged from the duct 152 via the air outlet ports 224a, 224b are further discharged out of the radiation image information reading apparatus via ducts, not shown, connected to the air outlet ports 224a, 224b. The dust particles gathered in the central region in the duct 152 by the first through fourth brush rollers 208a, 208b, 210a, 210b are efficiently discharged from either one of the air outlet ports 224a, 224b which are positioned above and below the central region in the duct 152.

In the embodiment shown in FIG. 9, the air outlet ports 230 provide an increased opening area in the upper housing member 200, and the duct 152 with the air outlet ports 230 is still of sufficient mechanical strength. The cleaning unit shown in FIG. 9 is highly effective in discharge dust particles.

In the embodiment shown in FIG. 10, the relatively large single air outlet port 230 defined in the upper panel of the upper housing member 200 is capable of forcibly discharge dust particles into the duct 232.

In the embodiment shown in FIG. 11, since the upper housing member 200 is angularly openable away from the lower housing member 202 about the shaft 234, the first through the fourth brush rollers 208a, 208b, 210a, 210b can easily be serviced for cleaning, repair, replacement, etc.

If the amount of dust particles is small, then the first brush roller pair 204 and the second brush roller pair 206 may not necessarily be provided in the duct 152 because dust particles can sufficiently be discharged from the duct 152 by only the multiblade fan 220 and the filter box 222.

In the embodiment shown in FIG. 13, while the stimulable phosphor sheet S is being fed in one direction, the first brush roller pair 204 and the second brush roller pair 206 can remove dust particles off the stimulable phosphor sheet S regardless of the rotational direction of the drive shaft 262. In the embodiment, if the first brush roller pair 204 is rotated at a speed higher than the speed at which the stimulable phosphor sheet S is fed, dust particles can be removed effectively from the stimulable phosphor sheet S. When the stimulable phosphor sheet S is fed from the third and fourth brush rollers 210a, 210b, it is also possible to remove dust particles from the stimulable phosphor sheet S. By changing the gear ratio between the gear 252 and the gear 258, i.e, by rotating the brush rollers at upstream position at a speed higher than the speed at which the stimulable phosphor sheet S is fed and rotating the brush rollers at downstream position at a speed lower than the speed at which the stimulable phosphor sheet S is fed, it is possible to remove dust particles from the stimulable phosphor sheet S even more effectively.

While the sheet-like member cleaning device and the radiation image information reading apparatus which incorporates the sheet-like member cleaning device have been described with respect to the stimulable phosphor sheet, the principles of the present invention are also applicable to other sheet-like members such as sheet-like recording mediums.

According to the present invention, as described above, dust particles that are floating or deposited in the duct or housing do not enter the feed system, and are prevented from being attached again to the sheet-like member.

Since dust particles in the duct are forcibly drawn and discharged out of the duct, it is possible to remove the dust particles from sheet-like members, particularly stimulable phosphor sheets, without the need for physical contact therewith. As a result, information such as characters, images, etc. carried on the stimulable phosphor sheets can accurately be read therefrom.

Brush rollers may be disposed in the duct or housing for removing dust particles off the stimulable phosphor sheet in sliding contact with the surfaces thereof.

The two brush roller pairs are disposed respectively in upstream and downstream locations, and rotated in different directions to gather dust particles in the central region in the duct, and the dust particles thus collected can be forcibly discharged out of the duct. In this manner, the dust particles can reliably be removed. When the upstream brush roller pair is rotated at a speed higher than the speed at which the sheet-like member is fed, dust particles on the sheet-like member can be scraped off and delivered forwardly of the sheet-like member. As a result, the dust particles can be collected with ease, and hence information recorded on the sheet-like member can be read quickly and reliably.

Although certain preferred embodiments of the present invention have been shown and described in detail, it should be understood that various changes and modifications may be made therein without departing from the scope of the appended claims.

What is claimed is:

1. A radiation image information reading apparatus for two-dimensionally reading information representing at least characters and an image carried by a stimulable phosphor sheet which is being fed by a feed system, comprising:
    a reading unit for reading the information from said stimulable phosphor sheet;
    a feed system for feeding the stimulable phosphor sheet to said reading unit;
    a cleaning mechanism disposed in said feed system upstream of said reading unit;
    said cleaning mechanism comprising:
        a housing surrounding a portion of said feed system; and
        an air suction unit for pressurizing an interior space of said housing with respect to an external atmosphere and providing an air flow which travels in a direction from one edge of the stimulable phosphor sheet towards another edge of the stimulable phosphor sheet, for preventing dust particles from being attached to surfaces of said stimulable phosphor sheet.

2. A radiation image information reading apparatus according to claim 1, wherein said housing has an air inlet for introducing air into said housing and an air outlet for drawing and discharging air introduced from said air inlet, whereby dust particles on the stimulable phosphor sheet in said housing can be guided by air introduced from said air inlet toward said air outlet and then discharged from said housing from said air outlet.

3. A radiation image information reading apparatus according to claim 1, wherein the air flow contacts said first surface of the stimulable phosphor sheet and returns along and contacts said second surface of the stimulable phosphor sheet.

4. A radiation image information reading apparatus according to claim 1, wherein the direction of the air flow is perpendicular to a feeding direction of said stimulable phosphor sheet.

5. A radiation image information reading apparatus for two-dimensionally reading information representing at least characters and an image carried by a stimulable phosphor sheet which is being fed by a feed system, comprising:
    a reading unit for reading the information from said stimulable phosphor sheet;
    a feed system for feeding the stimulable phosphor sheet to said reading unit;
    a cleaning mechanism disposed in said feed system upstream of said reading unit;
    said cleaning mechanism comprising:
        a housing surrounding a portion of said feed system; and
        a brush roller assembly with two brush rollers disposed in said housing, one of said brush rollers being in contact with a first surface of the stimulable phosphor sheet which is being fed by the feed system and another of said brush rollers being in contact with a second surface of the stimulable phosphor sheet, said second surface being opposite said first surface.

6. A radiation image information reading apparatus according to claim 5, further comprising:
    dust removing means disposed in said housing and held in contact with at least a tip end of said brush roller assembly, for removing dust particles from the tip end of said brush roller assembly.

7. A radiation image information reading apparatus according to claim 5, wherein said brush roller assembly comprising:
    upstream and downstream brush roller pairs disposed in a spaced interval in the direction in which said stimulable phosphor sheet is fed;
    said cleaning mechanism further comprising:
        drive means for rotating said upstream brush roller pair in a direction which is the same as said direction in which said stimulable phosphor sheet is fed, and rotating said downstream brush roller pair in a direction which is opposite to said direction in which said stimulable phosphor sheet is fed.

8. A radiation image information reading apparatus according to claim 7, wherein said drive means comprises:
    a single drive source for rotating said upstream and downstream brush roller pairs.

9. A radiation image information reading apparatus according to claim 7, wherein said drive means comprises:
    a drive source for rotating said upstream brush roller pair at a speed higher than the speed at which said stimulable phosphor sheet is fed.

10. A radiation image information reading apparatus according to claim 5, wherein said cleaning mechanism further comprises:
    a flow path for circulating air through said housing.

11. A radiation image information reading apparatus according to claim 5, further comprising air flow generating means for generating an air flow in a longitudinal direction from one end of said brush roller assembly towards another end of said brush roller assembly.

12. A radiation image information reading apparatus according to claim 11, wherein said air flow travels along and contacts a first surface of said stimulable phosphor sheet and returns along and contacts a second surface of said stimulable phosphor sheet, said second surface being opposite said first surface.

13. A radiation image information reading apparatus for two-dimensionally reading information representing at least characters and an image carried by a stimulable phosphor sheet which is being fed by a feed system, comprising:
    a reading unit for reading the information from said stimulable phosphor sheet;
    a feed system for feeding the stimulable phosphor sheet to said reading unit;
    a cleaning mechanism disposed in said feed system upstream of said reading unit;

said cleaning mechanism comprising:
- a housing surrounding a portion of said feed system; and
- a brush roller assembly disposed in said housing in contact with a surface of said stimulable phosphor sheet which is being fed by the feed system,
- wherein said brush roller assembly comprises upstream and downstream brush roller pairs disposed in a spaced interval in a direction in which said stimulable phosphor sheet is fed; and said cleaning mechanism further comprising drive means for rotating said upstream brush roller pair in a direction which is the same as said direction in which said stimulable phosphor sheet is fed, and rotating said downstream brush roller pair in a direction which is opposite to said direction in which said stimulable phosphor sheet is fed.

14. A radiation image information reading apparatus according to claim 13, wherein said drive means comprises:
- a single drive source for rotating said upstream and downstream brush roller pairs.

15. A radiation image information reading apparatus according to claim 13, wherein said drive means comprises:
- a drive source for rotating said upstream brush roller pair at a speed higher than the speed at which said stimulable phosphor sheet is fed.

* * * * *